United States Patent [19]

Kohiyama et al.

[11] Patent Number: 5,381,043
[45] Date of Patent: Jan. 10, 1995

[54] POWER SUPPLY ARRANGEMENT AND CONNECTOR

[75] Inventors: Tomohisa Kohiyama; Jun Kitahara, Kanagawa, Japan

[73] Assignee: Hitachi, Ltd., Tokyo, Japan

[21] Appl. No.: 13,999

[22] Filed: Feb. 5, 1993

Related U.S. Application Data

[63] Continuation of Ser. No. 646,392, Jan. 28, 1991, abandoned.

[30] Foreign Application Priority Data

Jan. 29, 1990 [JP] Japan .................................. 2-18298

[51] Int. Cl.$^6$ ........................ H05K 5/02; H05K 7/20; G06F 1/04
[52] U.S. Cl. .................................. 307/116; 307/150; 361/681; 361/683; 361/687; 364/707; 364/708.1
[58] Field of Search ............... 364/707, 708.1; 361/694, 729, 730, 785, 683–687, 682; 307/31, 116, 147, 150; 439/164, 165, 190, 194, 195, 489, 490

[56] References Cited

U.S. PATENT DOCUMENTS

| | | | |
|---|---|---|---|
| 3,049,591 | 8/1962 | Voige | 307/150 |
| 4,084,213 | 4/1978 | Kirchner et al. | 361/384 |
| 4,183,599 | 1/1980 | Wetzig | 439/195 |
| 4,530,066 | 7/1985 | Ohwaki | 364/708 |
| 4,595,872 | 6/1986 | Ball | 307/66 X |
| 4,620,110 | 10/1986 | Cooney | 307/150 |
| 4,680,674 | 7/1987 | Moore | 361/395 |
| 4,749,364 | 6/1988 | Arney et al. | 364/708 |
| 4,769,764 | 9/1988 | Levanon | 364/708 |
| 4,788,658 | 11/1988 | Hanebuth | 364/708 X |
| 4,817,865 | 4/1989 | Wray | 361/384 X |
| 4,858,070 | 8/1989 | Buron et al. | 361/384 |
| 4,860,185 | 8/1989 | Brewer et al. | 307/66 |
| 4,978,949 | 12/1990 | Herron et al. | 364/708 X |
| 4,980,848 | 12/1990 | Griffin et al. | 364/708 |
| 5,079,438 | 1/1992 | Heung | 307/141 |
| 5,097,388 | 3/1992 | Buist et al. | 361/393 |

FOREIGN PATENT DOCUMENTS 60-19223(A) 6/1985 Japan .................................. 364/707

*Primary Examiner*—A. D. Pellinen
*Assistant Examiner*—Fritz M. Fleming
*Attorney, Agent, or Firm*—Antonelli, Terry, Stout & Kraus

[57] ABSTRACT

A power supply arrangement for a main unit of a portable, battery operated information processing apparatus including at least a microprocessor and a battery. The power supply arrangement comprising an expansion unit for the portable information processing apparatus for expanding the operation capability of the main unit of the information processing apparatus upon connection therewith. The expansion unit includes a power circuit for converting an a.c. voltage to a d.c. voltage, the power circuit enabling supply of power to the main unit when the expansion unit is connected with the main unit. Also, a connection arrangement is provided for the expansion unit and main unit.

11 Claims, 11 Drawing Sheets

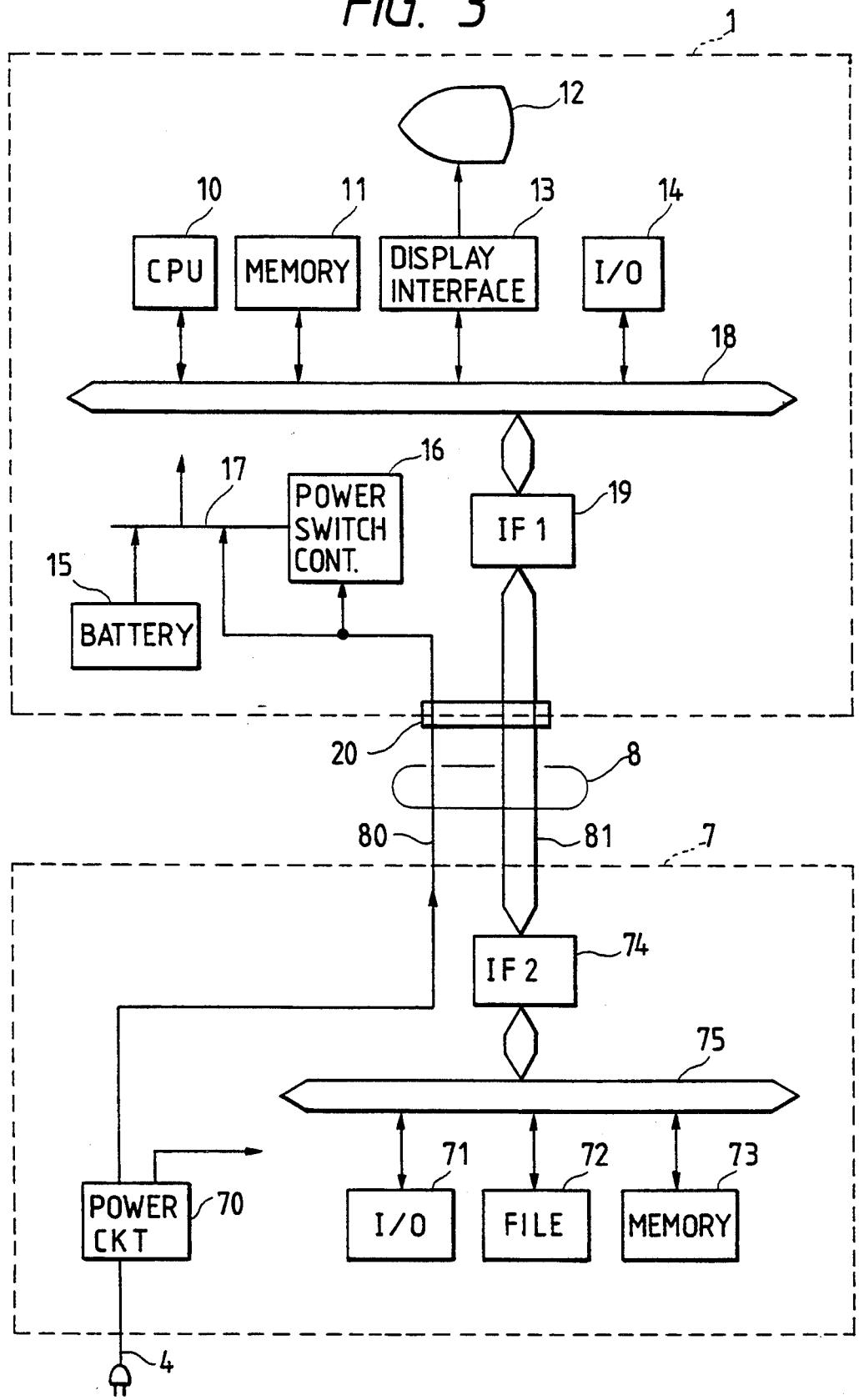

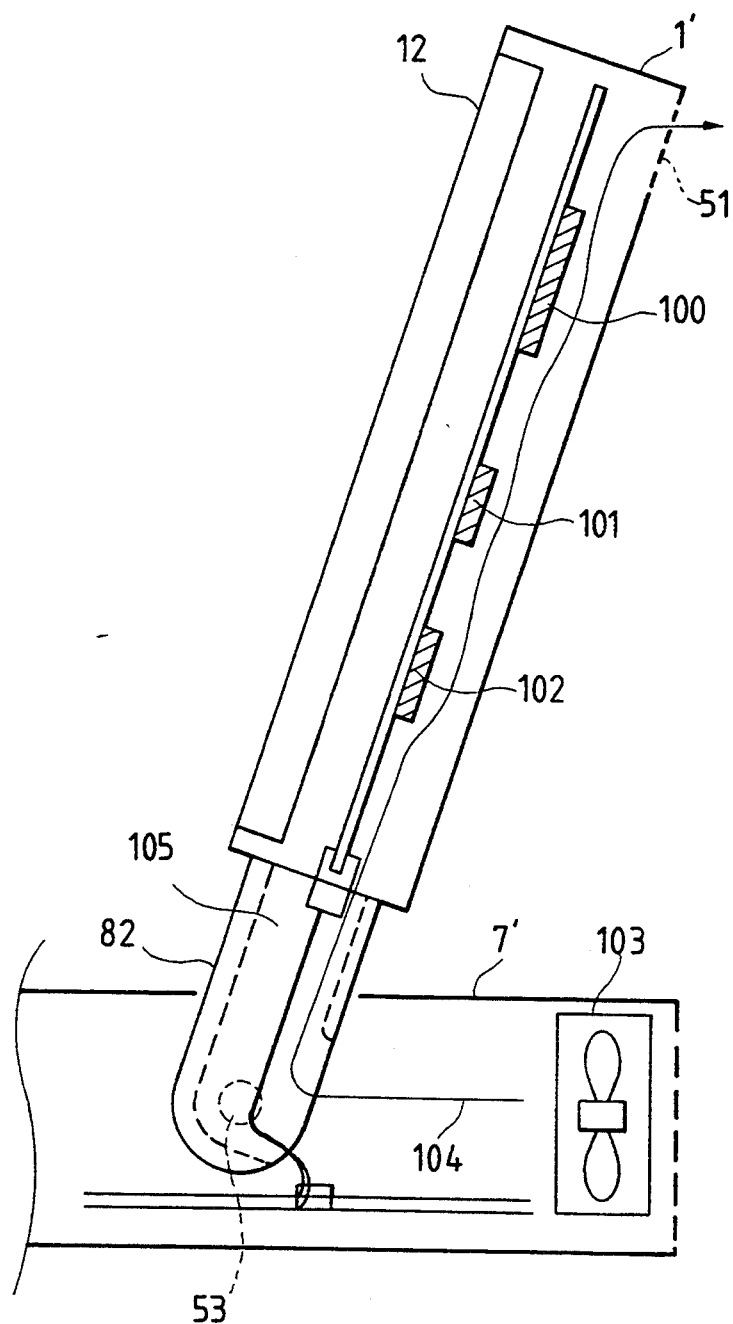

POWER SUPPLY ARRANGEMENT AND CONNECTOR

This application is a continuation of application Ser. No. 07/646,392, filed Jan. 28, 1991, now abandoned.

BACKGROUND OF THE INVENTION

The present invention relates to a power supply arrangement for a portable information processing apparatus such as a laptop computer.

Due to recent advanced semiconductor integration technology and packaging technology, hand-held and portable information processing apparatuses such as laptop computers or the like are becoming more prevalent. Such apparatuses, as described in Japanese Laid-Open Patent Application No. 61-218326, are basically battery operated, and are designed to connect with an a.c. adapter so that they operate by an a.c. power source or for connection with an external battery charging unit, as shown in FIG. 2 which is representative of the prior art.

FIG. 2 illustrates a main unit 1 of the information processing apparatus (hereinafter termed the "main unit"), an a.c. adapter 2, an a.c. cable 4, and a d.c. power cord 5 which supply power to the main unit. An expansion unit 3, such as a floppy disk unit is connected externally to the main unit 1, and a signal cable 6 connects the expansion unit 3 to the main unit. Conventionally, when the main unit 1 is used as a stand-alone equipment, it operates by the internal battery, or when it is used in connection with the expansion unit 3, it is further connected with the a.c. adapter 2 so that power is supplied from the a.c. adapter 2 instead of the battery in the main unit 1. The reason for this operational condition is that equipping the main unit 1 with a battery having sufficient power to drive the expansion unit 3 increases the weight and also the cost of a main unit 1. Since the weight and price of a portable apparatus are crucial factors for the user in choosing a model, conventionally, the battery built in the main unit 1 has its capacity limited to the minimum requirement.

The foregoing conventional technique, when the expansion unit is connected to the main unit, necessitates supply of power from the main unit to the expansion unit through the connection of an a.c. adapter. As a result, the number of cables running out of the main unit increases, which not only spoils the look of the operational environment, but also compels the user to labor in connecting and disconnecting the a.c. adapter to the main unit each time the apparatus is transported for use.

SUMMARY OF THE INVENTION

It is therefore an object of the present invention to provide a power supply arrangement for a portable information processing apparatus which eliminates the need for a separate a.c. adapter in using the expansion unit, thereby relieving the user of the labor of cable connection while retaining the good look of the apparatus installation.

It is another object of the present invention to provide a connector arrangement for a portable information processing apparatus.

In order to achieve the above objects, the present invention provides a power supply arrangement for the main unit of a portable information processing apparatus having at least a microprocessor and a battery, and an expansion unit which expands the function or operation capability of the main unit of the information processing apparatus and which includes a power circuit which converts an a.c. voltage into a d.c. voltage, so that when the apparatus is used with the expansion unit connected to the main unit, power is supplied from the expansion unit to the main unit.

In accordance with a feature of the present invention, the main unit comprises a switching device which selects the output of the battery or the output of the power circuit, and a switching controller which operates on the switching device to act upon detecting that the expansion unit is connected to the main unit. The switching controller is constructed, for example, to detect the connection of the expansion unit in a mechanical manner, or to detect the connection of the expansion unit to the main unit by detecting that the supply voltage from the expansion unit is within the prescribed voltage range.

The present invention also provides an apparatus connection arrangement for connecting the main unit of a portable information processing apparatus having at least a microprocessor, a battery and a display panel to an expansion unit which expands the function or operation capability of the main unit, wherein the connection arrangement includes a first connector provided on the upper side of the expansion unit and a second connector provided on one end of the main unit for direct connection with the first connector so that the main unit is connected electrically and mechanically to the expansion unit in such a state that the display panel is inclined by using the expansion unit as a support stage therefor.

In the apparatus connection arrangement, the expansion unit may be provided with an air flow generator, and a path for conducting the air flow from the expansion unit to the main unit may be provided. The expansion unit may be provided therein with a power circuit which converts the a.c. voltage into a d.c. voltage, so that when the expansion unit is connected to the main unit, power is supplied from the expansion unit to the main unit.

The expansion unit for expanding the function or operation capability of the main unit of a portable information processing apparatus having at least a microprocessor and a battery comprises any of an input/output device, an external storage unit or a memory element, a power circuit which receives an a.c. voltage from an a.c. power source through a power cable and converts the a.c. voltage into a d.c. voltage, and an arrangement for supplying the d.c. voltage from the power circuit to the main unit.

The connector arrangement in accordance with the present invention comprises a male connector housing, a female connector housing, a circuit opening/closing device having normal-open or normal-closed contacts provided on one or both of the connector housings, and an actuator which turns on the normal-open contacts or turns off the normal-closed contacts when the connector housings are coupled completely.

The conventional a.c. adapter has its power output intended to supplement the power for the expansion unit which cannot be provided by the main unit. On this account, the output of the a.c. adapter is supplied to the expansion unit by way of the main unit. Namely, when the expansion unit is used, a power source other than the battery of the main unit is required, and its power is consumed by the expansion unit. The present invention is constructed so as to build a power circuit in the expansion unit so that power is supplied from the expansion unit to the main unit, instead of supplying power from main unit to the expansion unit. This not only eliminates the need for an a.c. adapter in adding an expansion unit, but also relieves the user of the labor of connecting and disconnecting only the main unit in the device configuration including the main unit and expansion unit.

These and further objects, features and advantages of the present invention will become more obvious from the following description when taken in connection with the accompanying drawings which, for purposes of illustration only, several embodiments of the present invention.

BRIEF DESCRIPTION OF THE DRAWINGS

FIG. 3 is a block diagram showing an example of the internal arrangement of the present invention;

FIG. 5 is a schematic sectional view of a further embodiment of the invention;

DETAILED DESCRIPTION OF THE PREFERRED EMBODIMENTS

Figure 1:
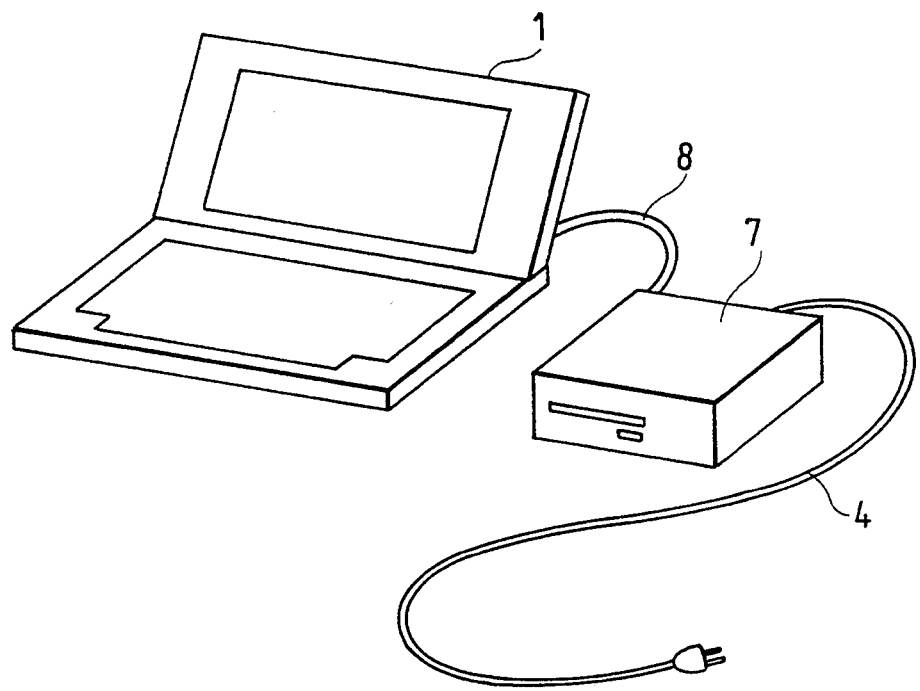
FIG. 1 is an external view of an embodiment of the invention.
Figure 2:
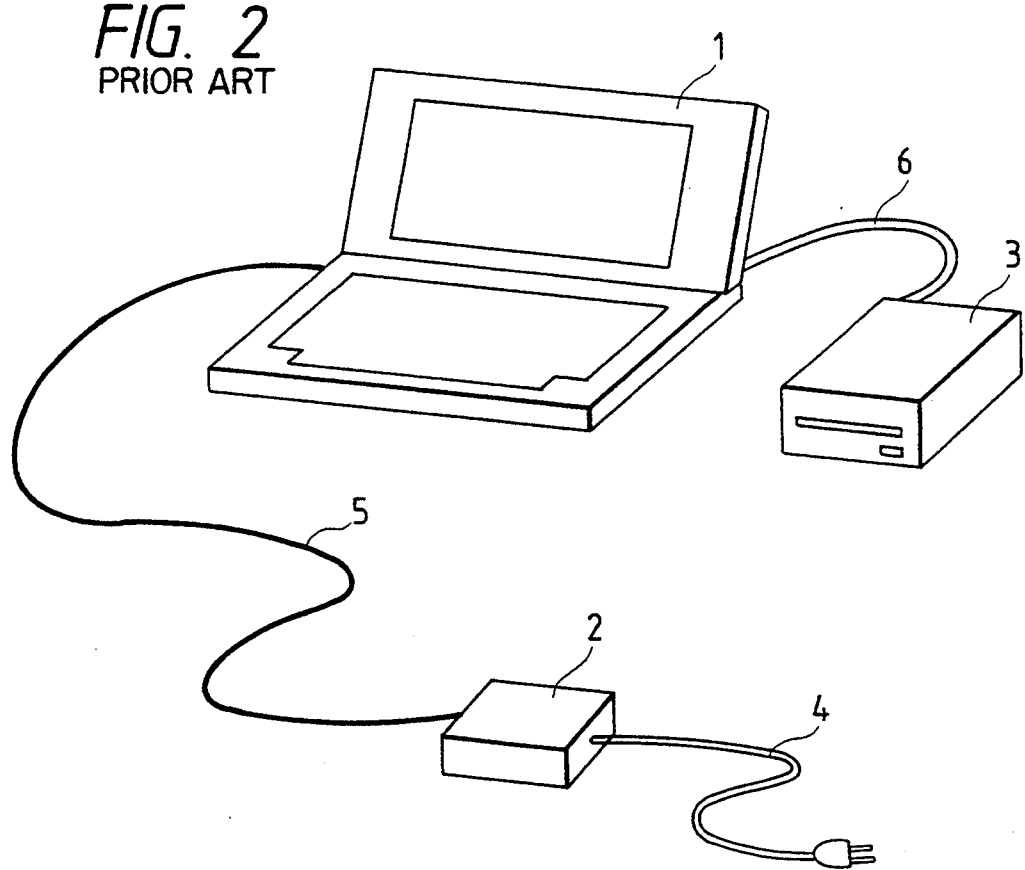
FIG. 2 is an external view of a conventional arrangement.

Referring now to the drawings, FIG. 1 shows an embodiment of the present invention wherein the main unit 1 of a portable information processing apparatus such as a laptop computer which incorporates a battery, and an expansion unit 7 which expands the function or operation capability of the main unit incorporates a power circuit and is provided with an a.c. cord 4 and a connection cable 8 for connecting the main and expansion units.

When the user carries and uses the main unit 1, it is operated on its built-in battery. When the user uses a peripheral device which is not included in the main unit 1, e.g., an expansion unit 7 such as an external storage unit, the expansion unit 7 is connected to the main unit 1 using the connection cable 8. In this case, the power circuit in the expansion unit 7 supplies power not only to the components in the expansion unit 7, but also to the components in the main unit 1 through the connection cable 8. It is also possible to charge the battery in the main unit 1 in this arrangement.

Next, an example of the internal block arrangement of this invention will be explained with reference to FIG. 3 which shows the arrangement of the internal blocks of the embodiment of FIG. 1, for example. In FIG. 3, the main unit 1 incorporates a microprocessor 10 (hereinafter termed CPU), a memory 11, a display panel 12 such as a liquid-crystal, electroluminescence, or plasma display panel, a display interface 13 for operating the display panel 12, and a basic input/output (I/O) device 14, such as a keyboard, printer or communication device. The basic I/O device 14 may include an external storage unit, e.g., a floppy disk unit. The main unit also includes a battery 15, and a power switching controller 16 which operates on a switching device 17 to select the battery 15 or external power source 80 by monitoring the power supply status from the expansion unit 7 to the external power source 80. The main unit further includes an internal signal bus 18, a first interface (hereinafter termed IF1) between signal lines 81 of the peripheral devices of the expansion unit 7 and the internal bus 18, and a connector 20 which connects the cable 8 to the main unit 1. The expansion unit 7 includes a power circuit 70, an extended I/O section 71 including card slots and network interface, for example, a file 72 for an external storage device such as a floppy disk unit, hard disk unit, tape cartridge unit or optical disk, an extended memory 73, a second interface 74 (hereinafter termed IF2) for connecting an internal bus 75 of the expansion unit 7 to the IF1 in the main unit 1, and an a.c. cord 4.

The expansion unit 7 in accordance with this invention includes at least the extended I/O section 71, file 72 and extended memory 73. The power circuit 70 supplies power not only to the expansion unit 7, but also to the main unit 1 through the external power line 80. The connection cable 8 may be combined with the power line 80 so that the expansion unit 7 can easily be connected or disconnected with the main unit through a single connection. Alternatively, the signal line 81 and power line 80 may have independent connectors, in accordance with features of the present invention which enable supply of power from the expansion unit 7 to the main unit 1. The power switching controller 16 in the main unit 1 may operate by mechanically detecting the connection of the connector 20 on the connection cable 8, or may operate by monitoring the voltage of the power line 80. Accordingly, the power switching device 17 can employ various schemes including a mechanical switch and electrical switch such as a semiconductor switching device. Adoption of a mechanical switch will reduce the cost, or adoption of an electrical switch will enable the main unit 1 to operate on the built-in battery 15 when the power circuit within the expansion unit 7 is turned off. Any of the switching schemes may be utilized in accordance with the present invention.

Figure 4A:
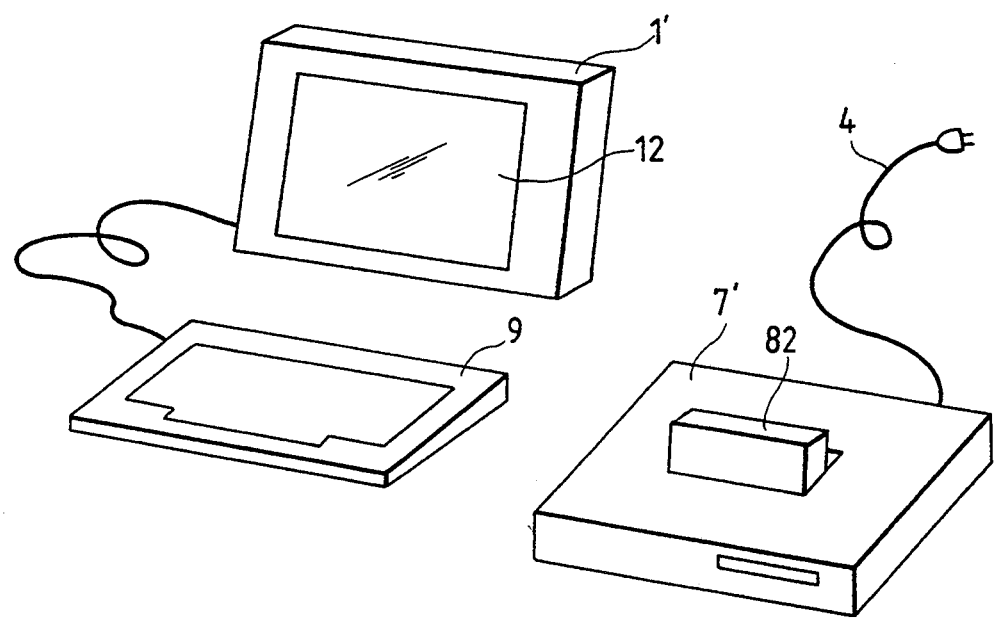
FIGS. 4A and 4B are external views of another embodiment of invention.
Figure 4B:
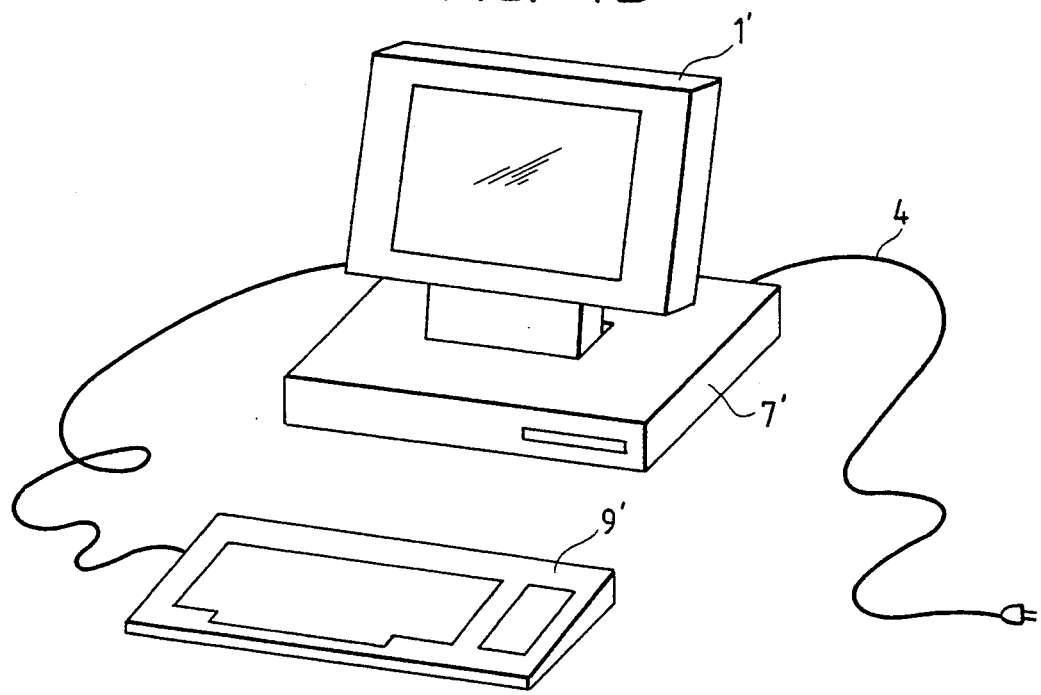

Another embodiment of the present invention will be described with reference to FIGS. 4A and 4B wherein FIG. 4A shows the main unit 1' of a portable information processing apparatus incorporating a battery, a display panel 12 equipped on the main unit, an external keyboard 9, an expansion unit 7' which incorporates a power circuit, a connector block 82, and an a.c. cord 4. In this embodiment, the main unit 1' is operative by itself based on its built-in battery. Instead of connecting the external keyboard 9 as shown, another input device such as a touch panel may be equipped on the display panel 12. The main unit 1' is connected to the connector block 82 as shown in FIG. 4B and this configuration allows the use of a larger, more convenient keyboard 9'. This embodiment enables the connection of the main unit 1' and expansion unit 7' through the connector block 82 instead of using the connection cable 8 used in the embodiment in FIG. 1, and provides the following effectiveness:

(1) The component devices can more easily be connected or disconnected by the user.
(2) The distance between the main unit 1' and the expansion unit 7' can be reduced, allowing the signal lines to run separately, whereby the apparatus can be operated stably at a higher clock frequency.
(3) The connector block 82 can be shielded easily, and the electromagnetic characteristics (EMC) can be enhanced.

The arrangement of FIGS. 4A and 4B can be modified as shown in FIG. 5, which shows another embodiment of the present invention. An information processing apparatus using a CPU has its power dissipation increased when the CPU is operated at a higher frequency, resulting in an increased heat dissipation requirement for the CPU and associated control circuit. In the arrangement of FIG. 4B, when the main unit 1' is operated at a clock frequency higher than the case of operating it alone, sufficient power can be supplied from the expansion unit 7', but a remaining problem is how to deal with internal heat of the main unit 1. The embodiment of FIG. 5 is suitable for heat removal due to an increase of the CPU clock frequency of the main unit 1' when it is connected with the expansion unit 7'.

FIG. 5 is a schematic side cross-sectional view of FIG. 4(B). The expansion unit 7' is provided therein with a cooling fan 103, and a blower duct 105 is provided inside the connector block 82. Parts 100, 101 and 102 represent components of the main unit 1' in which heat dissipation requirements increase as the clock frequency is raised. In operation, in response to the connection of the main unit 1' with the expansion unit 7', the power switching controller 16 of FIG. 3, for example, switches the power supply from the battery 15 in the main unit 1' to the external power line 80. At this time, the control output of the power switching controller 16 is used to raise the clock frequency of the CPU 10 as described hereinafter. Then, the main unit 1' which is now supplied with sufficient power from the expansion unit 7' operates at a higher speed than the operation based on the built-in battery 15. Consequently, heat dissipation requirements of the parts 100, 101 and 102 also increase, resulting in a rising internal temperature of the main unit 1'. The temperature rise is responded to by the activation of a cooling fan 103 in the expansion unit 7', and cooling air flows along the path shown by arrow 104 through the blower duct 105 in the connector block 82 and passes out through a vent 51 formed in the upper section of the main unit 1'. The parts 100, 101 and 102 are then cooled by the air. The air flow direction may be opposite to that shown. It is also possible to support the connector block 82 pivotably about a shaft 53 so that the tilt angle of the display panel 12 can be varied. In this case, a sealing arrangement (not shown) is provided if necessary so that the entirety of the air flow does not pass out at the linkage of the connector block 82 on the upper surface of the expansion unit 7'. According to this embodiment, as described, the expansion unit 7' supplies not only power but also air flow, allowing the apparatus to operate at a higher speed when the expansion unit is used. The apparatus is thus up-graded regardless of the capacity of the battery 15 built in the main unit 1'.

Figure 6A:
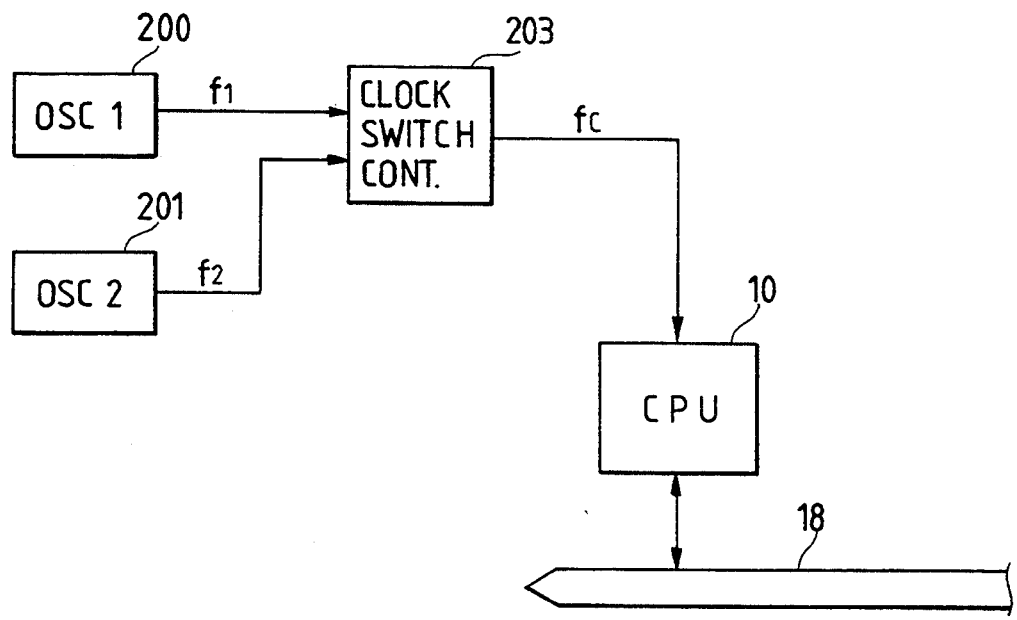
FIGS. 6A and 6B are block diagram arrangements for switching of clock frequency in accordance with the present invention.
Figure 6B:
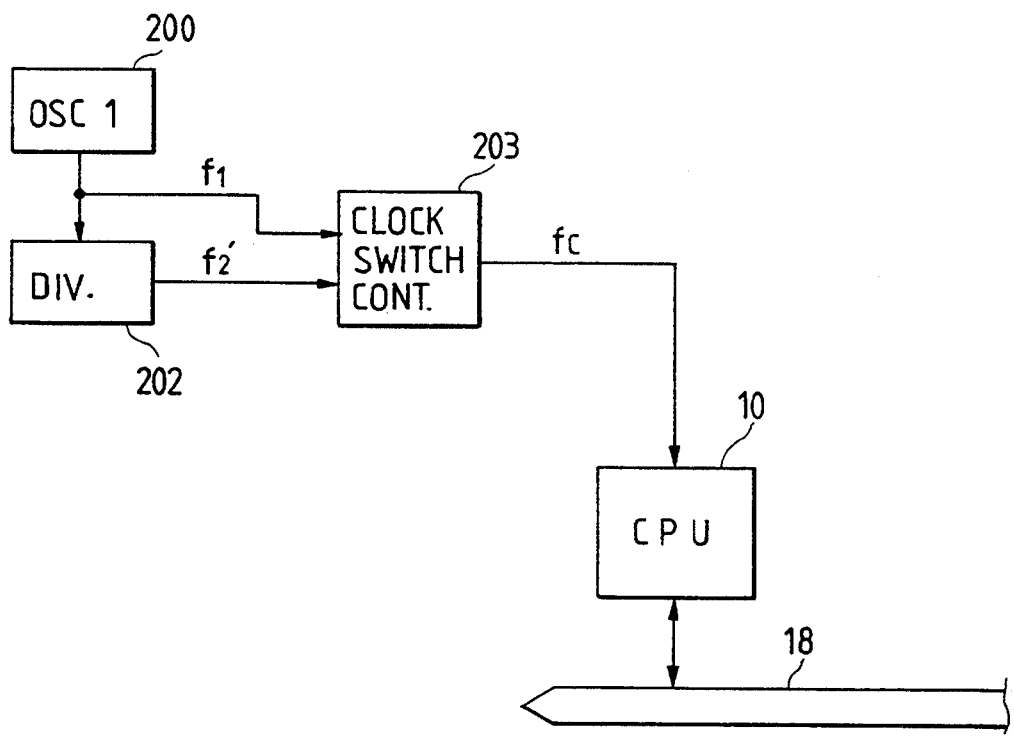

FIGS. 6A, 6B and 7A, 7B illustrate different arrangements for providing a higher CPU clock frequency. FIG. 6A shows an embodiment, in which a pair of oscillators 200, 201 respectively generate clocks having different oscillating frequencies f1, f2 (f1>f2), and these clocks are switched by a clock switching controller 203, and a clock having a frequency fc is supplied to the CPU 10. FIG. 6B shows another embodiment, in which a single oscillator 200 generates a clock having a frequency f1 which is supplied to a divider 202 and the clock switching controller 203. The divider 202 produces a clock of a frequency f2' (f1>f2') by dividing the clock delivered from the oscillator 200, and the clock (fc) is provided to the CPU 10 through the clock switching controller 203. In both embodiments, when the main unit is powered by the battery 15, the lower frequency f2 or f2' is selected as the clock (fc) by the clock switching controller 203, and when the power is supplied from the expansion unit, the higher frequency clock (f1) is selected as the clock (fc) by the clock switching controller 203.

Figure 7A:
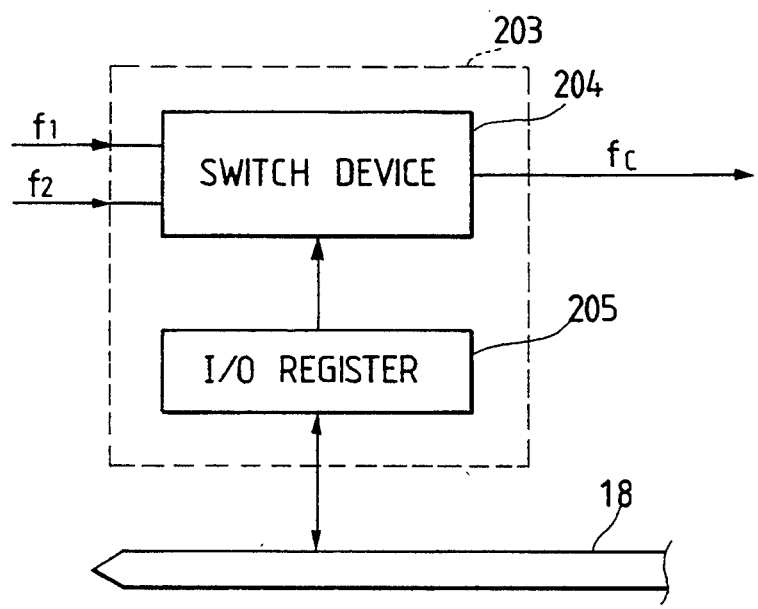
FIGS. 7A and 7B illustrate block diagram arrangements of a clock switching controller in accordance with the present invention.
Figure 7B:
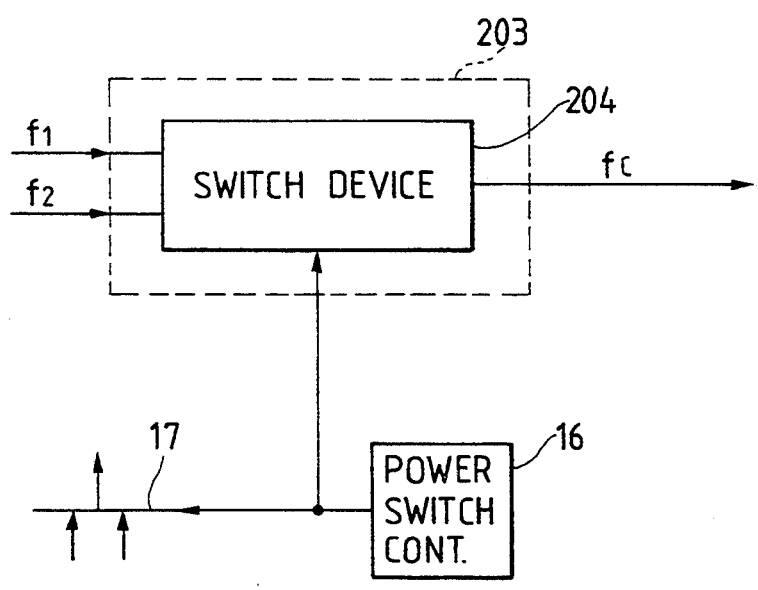

FIGS. 7A and 7B show examples of the clock switching controller 203 of FIGS. 6A, 6B. In FIG. 7A, the clock switching controller 203 includes a switching device 204, and an I/O register 205. The I/O register 205 can be set through the internal signal bus 18 with a program executed by the CPU 10, and the switching device 204 is controlled by the output of the I/O register 205 to change the clocks having the frequencies f1 and f2. In FIG. 7B, with the function of the above mentioned power switching controller 16, the clock switching controller 203 changes the clocks having the frequencies f1 and f2 (f2') at the same timing as the controller 16 controls the power switching device 17 to select the battery 15 or the external power circuit 70.

In the operation shown in FIG. 7A, although it is necessary to control the switching device 204 with the program, the CPU can change the operation frequency at a voluntary timing, so that if necessary, it becomes possible to execute a low power operation with a lowering of the operation frequency during the operation with the external power circuit 70. As such, it becomes possible to reduce the total power of the system during the waiting state of the system, for example, the duration of waiting for an input from a keyboard.

In the operation shown in FIG. 7B, it is not necessary to control the switching device 204 with the program, and it is possible to automatically raise the operation frequency of the CPU 10 when the power is supplied from the external power line 80. Therefore, it is not necessary to change the basic program of the CPU. Further, since it is possible to commonly use the function of the power switching controller 16, it becomes possible to simplify the hardware structure of the system.

In the above description, it is assumed that there are no changing hazards in the switching device 204. The changing hazards may be considered, for example, a transient signal having waveforms, the minimum period of which is smaller than t1 wherein t1 is the period of the clock having the frequency f2. Since the structure of the switching device 204 with no changing hazards is apparent to a person having ordinary skill in this art, it is not described herein.

Now, in FIG. 6A, although it is necessary to use two oscillators 200, 201, it is possible to determine any values for the frequencies f1, f2. In contrast, in FIG. 6B, the frequency f2' is selected by f1/n, where n is an integer and represents the divider value. However, since it needs only one oscillator, it is possible to reduce the cost of the system. Further, the clock switching controller 203 of FIG. 6A, and the divider 202 and the clock switching controller 203 of FIG. 6B could be also included in the CPU 10.

Figure 8A:
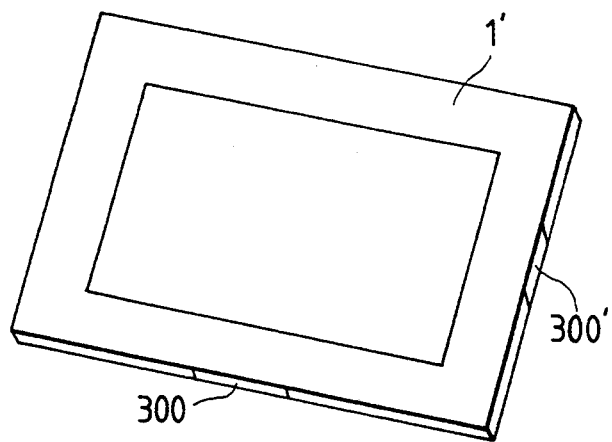
FIGS. 8A-8C illustrate connection arrangements.
Figure 8B:
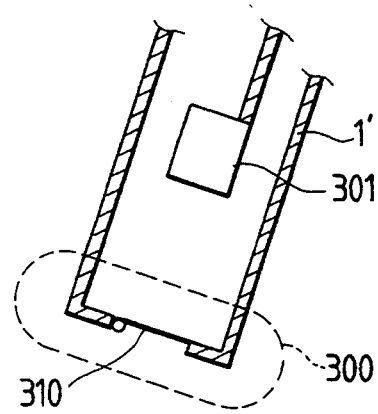

FIGS. 8A-8C and 9A, 9B show details of the structure of a connection unit of the main unit 1' and the connector block 82 as shown in FIGS. 4A, 4B. FIG. 8A shows positions of connection units 300, 300' of the main unit 1' to be connected to the expansion unit 7'. In FIG. 8A, two connection units 300, 300' are illustrated which, respectively, correspond to horizontally and vertically oblong screens of the display. Needless to say, it is possible to form only one of the connection units 300, 300'. FIG. 8B illustrates a side sectional view of an embodiment of the connection unit 300. A connector 301 is provided for transmitting signals from the main unit 1' to the expansion unit 7'. Further, a shutter 310 is provided for protecting the interior of the main unit 1' and the connector 301. The shutter 310 is opened into the interior of the main unit 1' and, for example, attached with a spring (not shown).

Figure 8C:
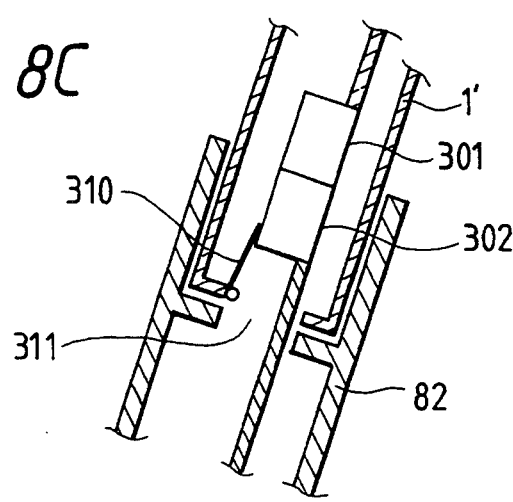

FIG. 8C illustrates a side sectional view of a state, in which the connection unit 300 of the main unit 1' is connected with the connector block 82. A connector 302 of the connector block 82 pushes and opens the shutter 310, so that the connector block 82 is connected to the main unit 1'. In this state since there exists a passage 311 for air flow, as previously described, it becomes possible to air-cool the main unit 1' in a case that the power is supplied to the main unit 1' from the expansion unit 7', and the main unit 1' is operated at high speed.

Figures 9A, 9B:
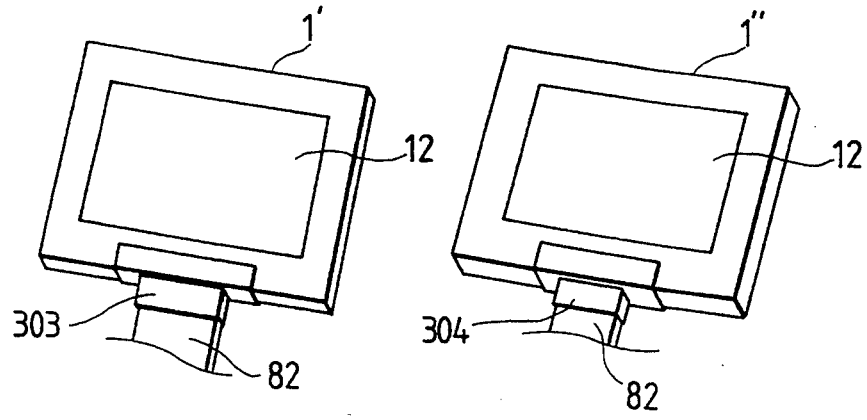
FIGS. 9A-9C illustrate other connection arrangements.
Figure 9C:
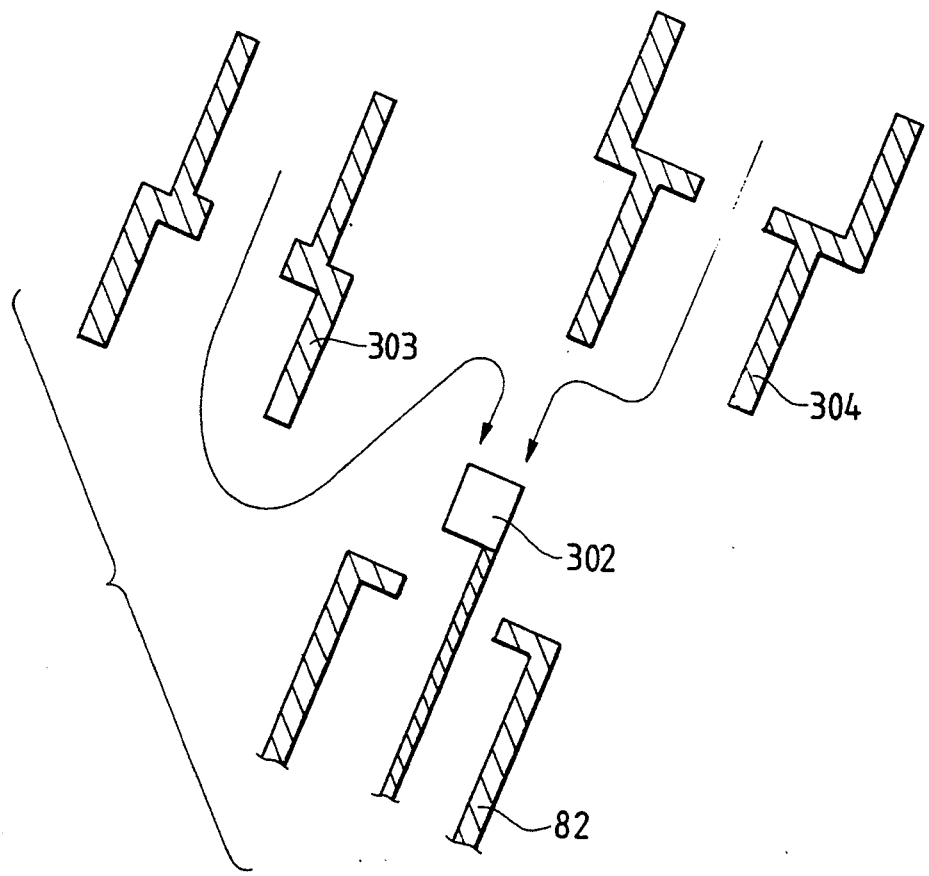

FIGS. 9A-9C show other embodiments, in which a thin main unit 1' or a thick main unit 1" is connected with the connector block 82 by using holder units 303, 304. There may be different types of main units since one of the main units may have a back light for the display panel 12, and another of the main units may not have such a back light. However, it is preferable to commonly use the expansion unit 7' for all of the different types of main units. FIGS. 9A and 9B illustrate views of the holder units 303, 304 respectively attached to the main units 1', and 1" having different thicknesses. FIG. 9C illustrates a side sectional view of the connector block 82, and the holder units 303, 304. The holder unit 303 corresponds to the thin main unit 1', and the holder unit 304 corresponds to the thin main unit 1". It becomes possible to connect the same connector block 82 and the main units 1', 1" having the different thicknesses by way of the respective holder units 303, 304, as shown.

Figure 10A:
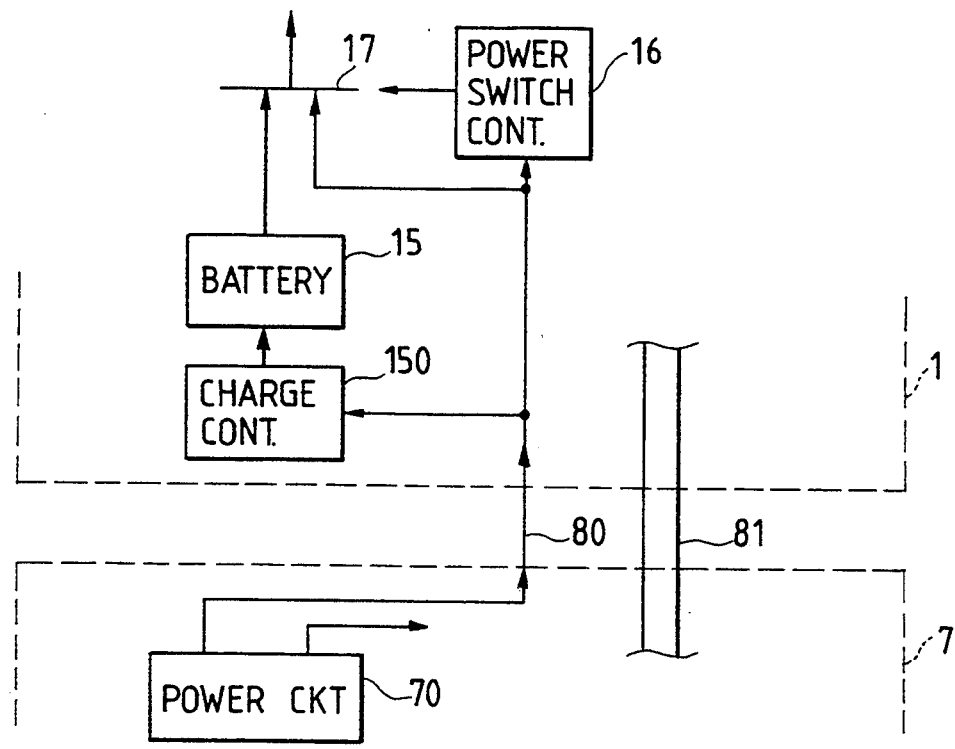
FIGS. 10A and 10B are block diagrams showing other embodiments of this invention.
Figure 10B:
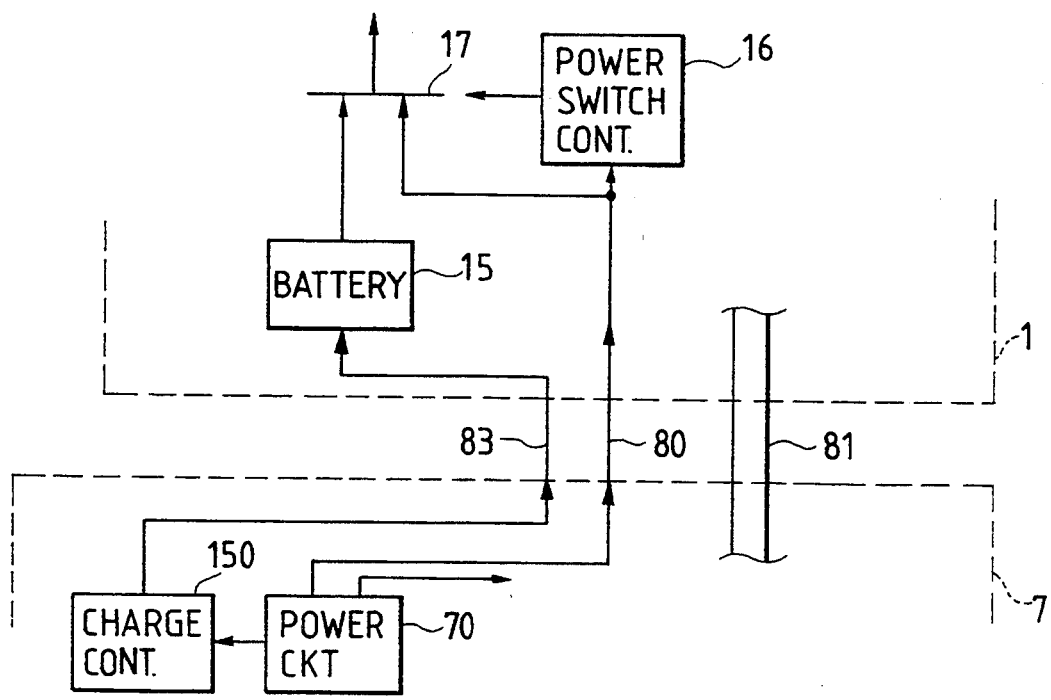

FIGS. 10A, 10B show further embodiments of the present invention, wherein the power supply system serves to charge the battery built in the main unit 1 when the expansion unit 7 is used. In FIG. 10A, a charging controller 150 for charging the battery 15 is provided in the main unit 1 whereas FIG. 10B shows an arrangement wherein the charging controller 150 is provided in the expansion unit 7. In any case, during the period when the battery 15 is charged by the charging controller 150, the main unit 1 is supplied with power from the power circuit 70 in the expansion unit 7. In FIG. 10A, only the power line 80 from the expansion unit 70 is required to supply power to the main unit 1 and charge the battery 15, allowing reduction in the number of wires in the cable 8 or connection block 82 between the main unit 1 and expansion unit 7, whereby the reliability of connector which is connected and disconnected repeatedly can be enhanced as compared with the case of FIG. 10B. The arrangement of FIG. 10B has the charging controller 150, which increases the weight, size and cost of the main unit in FIG. 10A, included in the expansion unit 7, whereby the size, weight and cost of the main unit can be reduced, although a charging power line 83 is needed.

Figure 11:
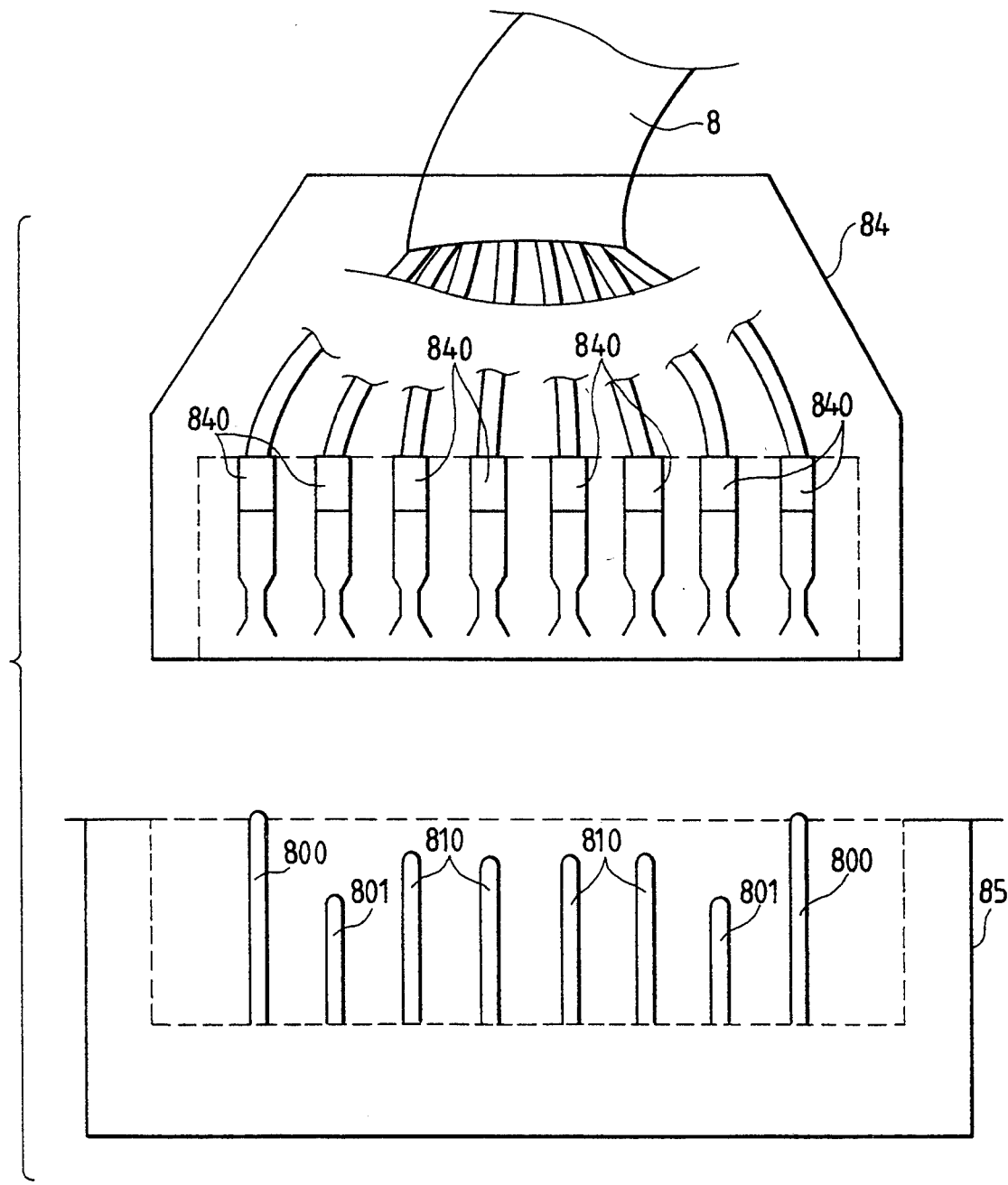
FIG. 11 shows a connection cable structure according to this invention.

FIG. 11 shows the arrangement of the connection cable in accordance with the present invention wherein the connection cable 8 for connecting the expansion unit to the main unit is provided with a connector housing 84 at the cable end and having contact pins 840. A connector housing is provided on either the main unit 1 or expansion unit 7 and includes ground pins 800, power pins 801, and signal pins 810. In this embodiment, when the connector 84 is connected to the connector 85, the ground pins 800 are first connected to the contacts 840, and next the signal pins 810 and finally the power pins 801 are connected to the corresponding contacts 840 When the connectors are disconnected, the pins are disconnected in the reverse order of connection, i.e., the power pins 801, signal pins 810 and ground pins 800. Consequently, the signal lines are left inactive until the power lines are connected which allows disconnection of the connection cable 8 during the operation. Small or portable information processing apparatuses are often handled by the user to connect or disconnect the expansion unit without suspending the job (i.e., with the power kept alive). This embodiment permits the user to disconnect the connector while the power is on, which not only enhances the usage, but also prevents electrical failure of the apparatus should the connector be disconnected accidentally.

Figure 12A:
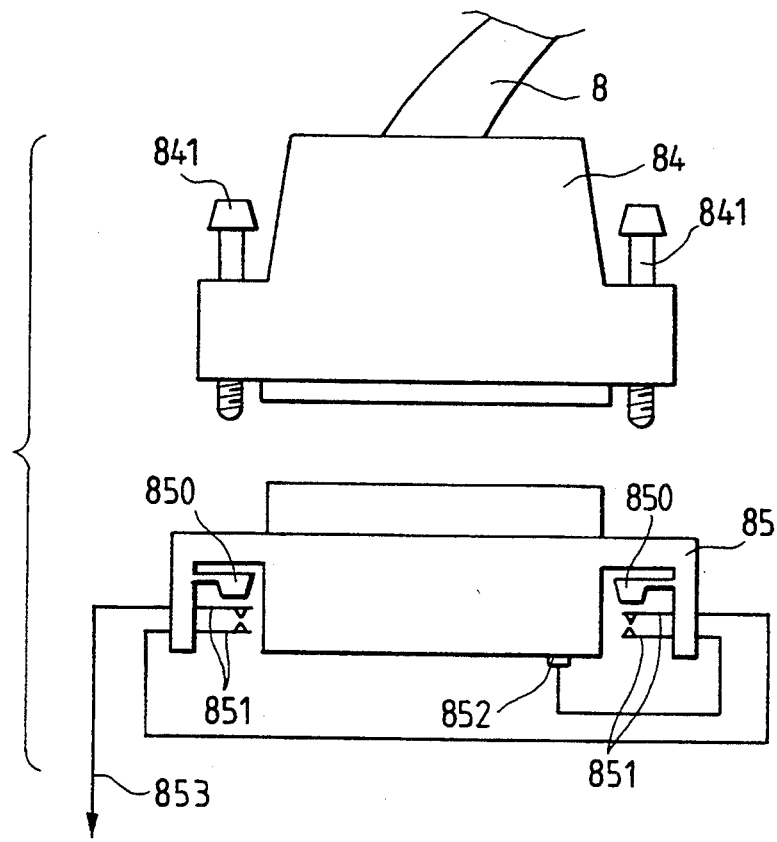
FIGS. 12A and 12B show other connection cable structures according to this invention.
Figure 12B:
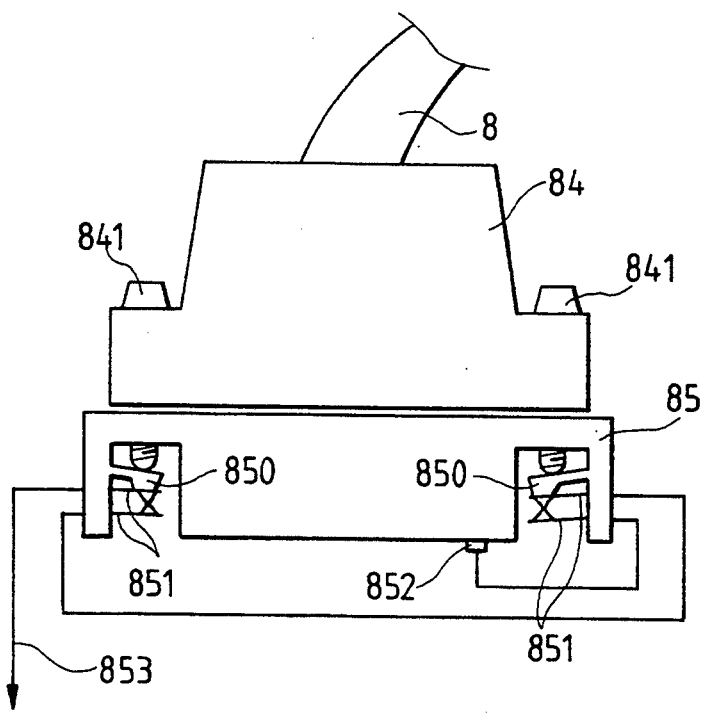

FIGS. 12A, 12B show an embodiment of the present invention, wherein the connector housing is provided with a circuit opening/closing device having normal-open contacts. As shown, a connector housing 84 is provided at the end of connection cable 8 and includes housing fixing screws 841. A connector housing 85 is provided on the main unit 1 and includes insulator springs 850, contacts 851 of the circuit opening/closing device, a power terminal 852 for receiving the connection cable 8, and a power line 853.

FIG. 12A shows the state of apparatus before the connection cable is connected. When the connector housings 84 and 85 are coupled, the terminal 852 is connected with the power output from the expansion unit 7, but the contacts 851 are kept open because the fixing screws 841 are not yet tightened and therefore power is not supplied to the main unit 1. FIG. 12B shows the state of apparatus after the fixing screws 841 are tightened to completely fix the housing 84 to 85. The fixing screws 841 push the insulator springs 850 down, resulting in the closure of the contacts 851, and the power output on the terminal 852 is conducted to the power line 853. According to this embodiment, as described, the fixing screws 841 function as an actuator, enabling power supply only after the connector is fixed completely, whereby the same effectiveness as of preceding embodiment can be attained. As apparent, a feature of this embodiment is the inclusion of the circuit opening/closing in part of the connector housing. The contacts 851 may be of normal-closed type, which open when the connector is connected. Although two pairs of contacts are shown in FIG. 12A, 12B, any number of contact pairs is possible. Further, although the figure shows the operation of the contacts by tightening the fixing screws 841, an alternative arrangement is such that the contacts are closed by simply inserting the connector all the way in.

As is apparent from the above description, the present invention, in which power is supplied from the expansion unit to the main unit when the expansion unit is used, provides the following pronounced effectiveness.

(1) The a.c. adapter is eliminated.
(2) The main unit may be provided with a battery having the minimum required capacity thereby enabling reduction of weight and cost of the main unit.
(3) Connection and disconnection between the main unit and expansion unit by the user are made easier.

While we have shown and described several embodiments in accordance with the present invention, it is understood that the same is not limited thereto but is susceptible of numerous changes and modifications as known to those skilled in the art and we therefore do no wish to be limited to the details shown and described herein but intend to cover all such changes and modifications as are encompassed by the scope of the appended claims.

What is claimed is:

1. A power supply arrangement for a main unit of a portable information processing apparatus including at least a microprocessor and a battery and without means for converting an a.c. voltage to a d.c. voltage, the power supply arrangement comprising an expansion unit of the portable information processing apparatus for expanding the operation of the main unit of the information processing apparatus upon connection therewith, the expansion unit including power circuit means for converting an a.c. voltage into a d.c. voltage, the power circuit means of the expansion unit enabling supply of d.c. power to the main unit when the expansion unit is connected with the main unit, the main unit only being operable by d.c. power, wherein the main unit includes switching means for selecting one of an output of the battery and an output of the power circuit means, and switching control means for detecting connection of the expansion unit with the main unit and for enabling operation of the switching means in accordance therewith, wherein the microprocessor of the main unit is operable at at least first and second frequencies different from each other, and the switching control means enables operation of the microprocessor at one of the first and second frequencies, and wherein the first frequency is higher than the second frequency and the second frequency is utilized when the microprocessor is operated by the battery, the switching control means enabling operation of the microprocessor at the first frequency at least in response to the detection of the connection of the expansion unit with the main unit.

2. A power supply arrangement according to claim 1, wherein the switching control means includes means for detecting the mechanical connection of the expansion unit with the main unit.

3. A power supply arrangement according to claim 1, wherein the switching control means includes means for detecting an input voltage from the expansion unit as a detection of the connection of the expansion unit with the main unit.

4. A power supply arrangement according to claim 1, further comprising:

a male connector housing coupled to one of the main unit and the expansion unit;
a female connector housing coupled to the other of the main unit and the expansion unit;
circuit opening/closing means having one of normal-open and normal-closed contacts provided on at least one of the male connector housing and the female connector housing; and
actuator means for at least one of turning on the normal-open contacts and turning off the normal-closed contacts when the male connector housing and the female connector housing are completely coupled to one another.

5. A connection arrangement for connecting a main unit of a portable information processing apparatus to an expansion unit which expands the operation capability of the main unit of the information processing apparatus, the main unit having at least a microprocessor, a battery and a display panel and without means for converting an a.c. voltage to a d.c. voltage, the main unit being operable only by d.c. power, the connection arrangement comprising a first connector provided on a top surface of the expansion unit and a second connector provided on one end of the main unit, the first and second connectors being arranged for direct connection so as to electrically and mechanically connect the expansion unit with the main unit so that the expansion unit serves as a base support for the main unit connected therewith and the main unit extends upwardly from the top surface of the expansion unit, and the display panel of the main unit being adapted to be inclined with respect to the expansion unit as the base.

6. A connection arrangement according to claim 5, wherein the expansion unit includes air flow generation means, and the first and second connector delimit a path for enabling air flow generated by the air flow generation means through portions of the expansion unit and the main unit.

7. A connection arrangement according to claim 6, wherein the expansion unit includes power circuit means for converting an a.c. voltage into a d.c. voltage, the power circuit means supplying d.c. power from the expansion unit to the main unit when the expansion unit is connected with the main unit.

8. A connection arrangement according to claim 5, wherein the expansion unit includes power circuit means for converting an a.c. voltage into a d.c. voltage, the power circuit means supplying d.c. power from the expansion unit to the main unit when the expansion unit is connected with the main unit.

9. A connection arrangement according to claim 5, wherein one of the first and second connectors includes a male connector housing and the other of the first and second connectors includes a female connector housing, at least one of the first and second connectors including circuit opening/closing means having one of normal-open and normal-close contacts, and actuator means for one of turning on the normal-open contacts and turning off the normal-closing contacts when the first and second connectors are completely coupled to one another.

10. An expansion unit for expanding an operation capability of a main unit of a portable information processing apparatus having at least a microprocessor and a battery and without means for connecting an a.c. voltage into a d.c. voltage, the expansion unit comprising:

at least one of an input/output device, external storage unit and memory element;

power circuit means for receiving an a.c. voltage from an a.c. power source through a power cable and for converting the a.c. voltage into a d.c. voltage;

means for supplying the d.c. voltage from the power circuit means of the expansion unit to the main unit for enabling operation of the main unit in accordance therewith, the main unit being operable only by d.c. voltage;

a connector provided on a top surface of the expansion unit for enabling direct connection with a connector of the main unit, the expansion unit upon direct connection with the main unit serving as a support base therefor so that the main unit extends upwardly from the top surface of the expansion unit.

11. An expansion unit according to claim 13, wherein the expansion unit includes air flow generation means therein for enabling cooling of the main unit.

* * * * *